United States Patent [19]

Merchant et al.

[11] Patent Number: 5,422,733
[45] Date of Patent: Jun. 6, 1995

[54] METHOD AND APPARATUS FOR FACSIMILE COMMUNICATION OF FIRST AND SECOND TYPE INFORMATION WITH SELECTIVE CALL COMMUNICATION SYSTEMS

[75] Inventors: Zaffer S. Merchant, Lantana; Ali Saidi, Boynton Beach; Noah P. Orlen, Boca Raton, all of Fla.

[73] Assignee: Motorola, Inc., Schaumburg, Ill.

[21] Appl. No.: 191,897

[22] Filed: Feb. 4, 1994

[51] Int. Cl.6 .................. H04N 1/32; H04N 1/41; H04Q 7/00
[52] U.S. Cl. ......................... 358/407; 358/426; 358/440; 358/468; 379/58; 455/31.1; 455/38.4
[58] Field of Search ............... 358/402, 407, 404, 426, 358/440, 438, 442, 445, 468; 382/56, 61; 455/38.4, 31.1, 33.1; 340/825.44; 379/58, 59

[56] References Cited

U.S. PATENT DOCUMENTS

| | | | |
|---|---|---|---|
| 4,589,144 | 5/1986 | Namba | 382/61 |
| 4,897,733 | 1/1990 | Sakaguchi et al. | |
| 4,920,427 | 4/1990 | Hirata | |
| 4,924,521 | 5/1990 | Dinan et al. | 382/56 |

*Primary Examiner*—Scott A. Rogers
*Attorney, Agent, or Firm*—Keith A. Chanroo

[57] ABSTRACT

A selective call communication system (10) has a scanner (14) for retrieving information from a source document (26). The source document (26) includes a region of interest (42) formatted in at least two format regions (50, 52, 54). The at least two format regions (50, 52, 54) include a first format region (50, 52) designated for a first type information, and a second format region (54) designated for a second type information. The scanner (14) further includes an encoder (708) for encoding and compressing the information; and a modem (710), coupled to the encoder (708), for transferring the information to a selective call terminal (28). The selective call terminal (28) has a receiver (202) for receiving the information; and a processor (20), coupled to the receiver (202), for processing the information. The processor (20) further comprises a first encoder (214) for encoding and compressing the first type information according to a first encoding and compression technique; and a second encoder (224) for encoding and compressing the second type information according to a second encoding and compression technique. A transmitter (30), coupled to the processor (20), transmits the information being processed to an at least one selective call receiver (40).

20 Claims, 7 Drawing Sheets

5,422,733

METHOD AND APPARATUS FOR FACSIMILE COMMUNICATION OF FIRST AND SECOND TYPE INFORMATION WITH SELECTIVE CALL COMMUNICATION SYSTEMS

FIELD OF THE INVENTION

This invention relates in general to facsimile communications and more specifically to a method and apparatus for providing facsimile communication with selective call receivers.

BACKGROUND OF THE INVENTION

Contemporary selective call receiver communication systems employ messaging schemes that can deliver voice, numeric, or alphanumeric messages to its user. The majority of selective call systems transmit address and message information using a protocol such as GSC (Motorola's Golay Sequential Code) or POCSAG (Great Britain's Post Office Code Standardisation Advisory Group). To originate a message or page, a base station (or selective call terminal) is typically accessed via a Public Switch Telephone Network (PSTN) from a telephone. As a voice message entry device, the telephone is acceptable but when data needs to be entered, an alternative means of entry is desirable. Alternative entry devices such as computer terminals or custom entry devices work well if the originator can convey information to the user in a textual format. Unfortunately, when a user must convey a large amount of information or graphic-type information, existing selective call messaging (paging) systems and data transport protocols do not gracefully allow for the transmission of either long textual messages or messages containing graphical data. This is because selective call receivers are powered by limited energy content battery supplies that are quickly degraded when receiving and displaying long messages. In addition, because of the miniature size of the selective call receiver and its display, the information received is not easily readable and accessible to the user.

While contemporary facsimile communication equipment employ data compression techniques in their coding formats, such data compression techniques are inadequate for adequately preserving the battery lives of the selective call receivers. Furthermore, the long data messages indicative of facsimile communication would also destroy the battery saving schemes currently being employed with selective call communication systems. Therefore, because in facsimile communications long textual or graphical information are transmitted to the selective call receivers, the selective call receivers' battery lives are severely degraded. This makes facsimile communication unattractive to the users of selective call receivers even though the need exists.

Thus, what is needed is a method and apparatus, in a selective call communication system, for providing facsimile communication that is designed specifically to meet these constraints, namely, a significant reduction in the number of bits required to transmit the information over-the-air while minimizing the inconvenience of the users by making the information suitable for display on a miniature display screen.

SUMMARY OF THE INVENTION

In a selective call communication system, a method of facsimile communication comprises the steps of: (a) retrieving information from a source document. The information from the source document is formatted in at least two format regions. The at least two format regions comprise a first format region designated for a first type information, and a second format region designated for a second type information. The method further comprises the steps of: (b) encoding and compressing the information; (c) transferring the information to a selective call terminal; (d) receiving the information at the selective call terminal; and (e) processing the information. The step of processing in the selective call terminal further comprises the steps of: (f) identifying the first type information received from the first format region and the second type information received from the second format region; (g) encoding and compressing the first type information according to a first encoding and compression technique; (h) encoding and compressing the second type information according to a second encoding and compression technique; and (i) transmitting the information being processed to an at least one selective call receiver.

A selective call communication system comprises a scanner for retrieving information from a source document. The source document includes a region of interest formatted in at least two format regions. The at least two format regions comprise a first format region designated for a first type information, and a second format region designated for a second type information. The scanner further comprises an encoder for encoding and compressing the information; and a modem, coupled to the encoder, for transferring the information to a selective call terminal. The selective call terminal comprises a receiver for receiving the information; and a processor, coupled to the receiver, for processing the information. The processor further comprises a first encoder for encoding and compressing the first type information according to a first encoding and compression technique; and a second encoder for encoding and compressing the second type information according to a second encoding and compression technique. A transmitter, coupled to the processor, transmits the information being processed to an at least one selective call receiver.

DESCRIPTION OF A PREFERRED EMBODIMENT

Figure 1:
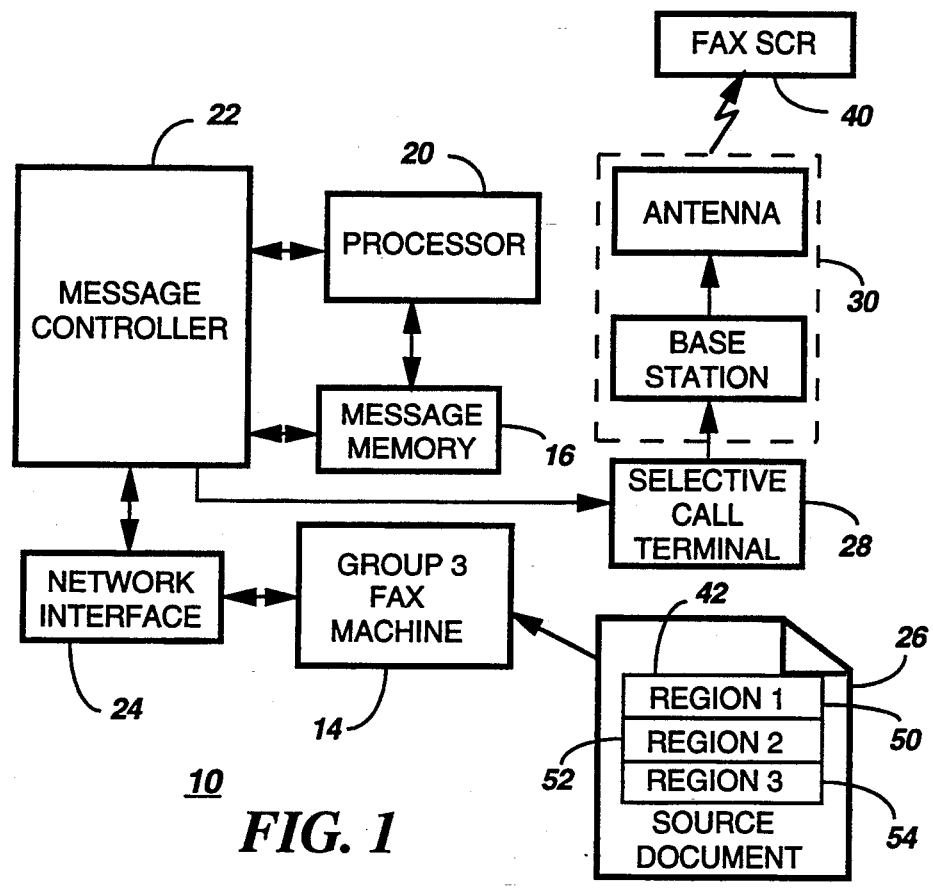
FIG. 1 is an electrical block diagram of a selective call communication system in accordance with the preferred embodiment of the present invention.

Referring to FIG. 1, an electrical block diagram of a selective call communication system 10 is shown in accordance with the preferred embodiment of the present invention. Operationally, a user enters a source document 26 into a facsimile (FAX) machine 14, the FAX machine 14 reads (or scans) and quantizes the image (message or information) contained thereon. Preferably, the information is contained in a predefined information region (region of interest) 42 of the source document 26. The region of interest 42 is formatted preferably in at least two format regions 50-54. The at least two format regions, as illustrated, comprise a first format region 50, a second format region 52, and a third format region 54. The FAX machine 14 is coupled to a message controller 22 via a network interface 24 which is ultimately coupled to a selective call terminal 28. The network interface 24 is, well known to one of ordinary skill in the art, can include a Public Switch Telephone Network (PSTN) or an Integrated Service Digital Network (ISDN). It can also be appreciated by one of ordinary skill in the art that the FAX machine 14 can be directly connected to the message controller 22 via a high speed network (e.g., RS-232, IEEE 802.3) to achieve an extremely high speed message throughput. Therefore, the FAX machine 14 needs not be located at the same physical site as the selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the sender, for example, enters the subscriber's cap-code (address) and other system information in the first format region 50, a hand-written message in the second format region 52, and a graphic information (drawing, graphs, etc.) in the third format region 54 of the source document 26. Preferably, the region of interest 42, according to the preferred embodiment of the present invention, comprises a first format region 50, 52 which includes the first and second format regions 50, 52 as shown for receiving address, system type information and the text (hand written) information 50, 52; and the second format region 54 includes the graphic information. The sender can send a FAX, by alternatively, calling the subscriber's paging service provider using a conventional telephone to enter, for example, the user's cap-code number (a unique number assigned by the paging service provider that corresponds to the actual coded address of a selective call receiver) and other system information. The paging service provider maintains a list of FAX capable cap-code numbers (addresses) and upon receiving the entered cap-code number, a procedure to receive a facsimile message is initiated. The user, according to the preferred embodiment, enters the address of the selective call receiver to which the FAX is intended and other system information along with a written text message (preferably a handwritten message) in the first format region 50, 52 of the source document 26. Additionally, the sender can include a drawing, graphic, or other pictorial information in the second format region 54 of the source document 26. The source document 26 is then scanned into the FAX machine 14. The processing of the information, the hand written message (text information) 50, 52 and graphic information 54 include encoding, compressing and transferring the information to the selective call terminal 28 which will produce a paging FAX message that will be transmitted to the targeted subscriber. The method, protocol, and apparatus required for the transmission of the paging message will be discussed in detail below.

After the document has been entered into the FAX machine 14, the entire source document 26 including the handwritten message and the graphic information contained in the region of interest 42 is scanned and quantized. Thereafter, the information is encoded and compressed in the FAX machine preferably according to the Group III FAX coding scheme which is well known to one of ordinary skill in the art. The Group III facsimile (FAX) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the message is Group III encoded and compressed, it is transferred to the message controller 22 via the PSTN 24. The message controller 22 directs the message to a processor 20 for providing additional processing of the message suitable for selective call communication. After storing at least a portion of the information in a message memory 16, the processor 20 and the message controller 22 begin processing the information, the details will be discussed below.

This additional processing according to the preferred embodiment of the present invention is necessary for extending facsimile communication to include selective call communication without destroying the selective call receivers' battery lives and battery saving features. For example, assuming a resolution of 200 by 200 dots-per-inch (dpi) or dots-per-2.5 cm and assuming a message containing 35 lines having an average of 50 characters-per-line on an A4 page size (approximately 21.0 cm by 29.7 cm) containing only text. To transmit this message when compressed, assuming a byte oriented serial protocol with no error correction, would take approximately 60 seconds at 1200 baud (one baud is defined as one symbol having eight information bits-per-second). The resulting transmission time of almost sixty seconds-per-page is impractical in terms of the economics of using a radio frequency paging channel. Therefore, there must be a substantial reduction in transmission time before FAX paging becomes attractive to current subscribers of selective call communication systems.

As can be seen, the transmission of the FAX message must yield an improvement when compared with binary data and Group III facsimile machines. When this example is presented using a typical over-the-air coding scheme such as GSC (Motorola's Golay Sequential Code) or POCSAG (Great Britain's Post Office Code Standardisation Advisory Group), the overhead increases by the amount of parity bits associated with the code selected. This increases the total transmission time by the ratio of the coded data to the un-coded data. In the case of GSC which is a (23,12) code (23 total bits of which 11 are parity bits and 12 are data bits), one would expect to see an increase in time of approximately 109 percent as compared to the un-coded data.

Figure 2:
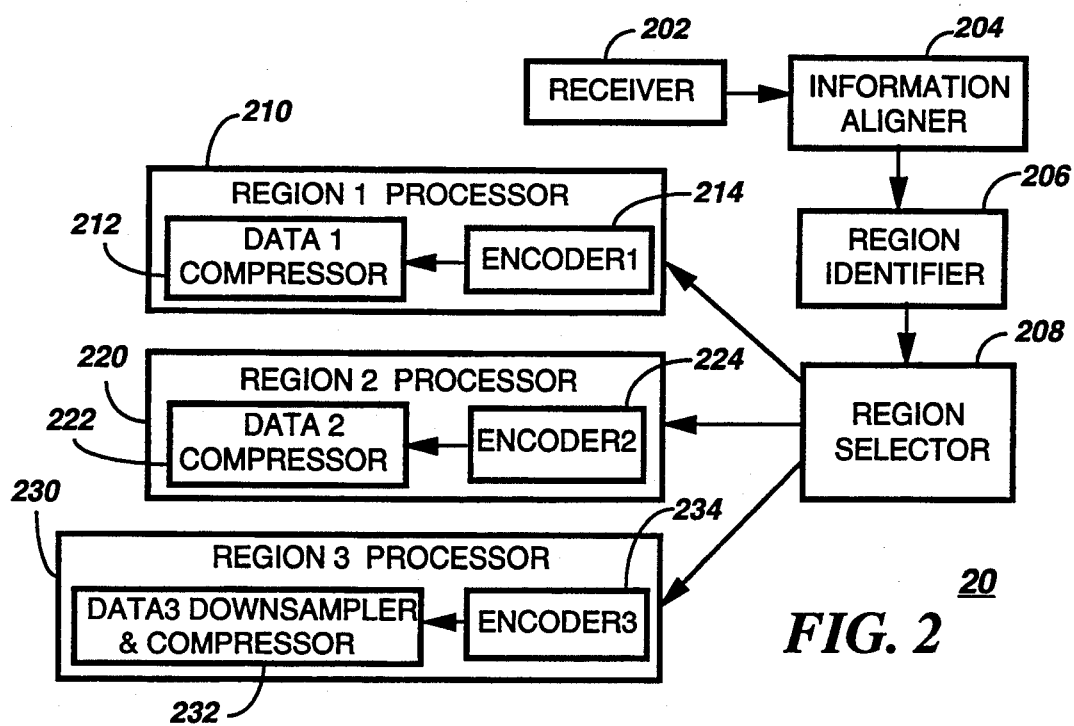
FIG. 2 is an electrical block diagram of a processor of the selective call communication system of FIG. 1.

Referring to FIG. 2, an electrical block diagram of the processor 20 of FIG. 1 is illustrated. When the message is received by a receiver 202 of the processor 20, an information aligner 204 extracts the information in the region of interest 42. A region identifier 206 processes an at least one marker (FIGS. 5 and 6) for precisely determining the location the region of interest 42 on the source document 26. The marker(s) are positioned on the source document 26 to facilitate the precise location of the region of interest 42. When the marker(s) are located, the processor 20 is able to use the position of the marker(s) to correct any distortions introduced by the FAX machine 14 or the transmission over the wireline, such as alignment, rotation, and scaling. Once the region of interest 42 is located, the different format regions 50-54 are then determined. The location of each format region is precisely determined relative to the marker(s). According to the preferred embodiment, the coordinates of each of the format region is preassigned based on an X-Y displacement from the located marker(s). The region identifier 206, after locating the marker(s), calculates the adjustments to compensate for any distortions that may be introduced by the FAX machine 14 or by the transmission, etc. A region selector 208 retrieves the information within each format region. For example, in a three format regions, the region selector 208 retrieves preferably the address and other systems information from the format region 1, and a region 1 processor 210 processes the information retrieved therefrom. The region 1 processor 210 comprises an encoder 214 which encodes the information, preferably text formatted information, according to the American Standard Code for Information Interchange (ASCII), and a data1 compressor 212 coupled to the encoder 214 compresses the encoded information. The information is then stored in memory 16 for later transmission. Similarly, the region selector 208 thereafter retrieves the information, preferably ASCII coded text information from the second format region 52, and a region 2 processor 220 processes the retrieved information. The region 2 processor 220 comprises an encoder 224 which encodes the information, preferably text formatted information, according to the ASCII standard, and a data2 compressor 222 coupled to the encoder 224 compresses the encoded information. The information is then stored in memory 16 for later transmission. Finally, the region selector 208 retrieves the information, preferably graphic-type information from the third format region 54, and a region 3 processor 230 processes the retrieved information. The region 3 processor 230 comprises an encoder 234 which encodes the information, preferably graphic-type information by a technique of Huffman coding the run length and a data3 downsampler/compressor 232 coupled to the encoder 234 downsamples and compresses the encoded information. Downsampling is performed by intelligently selectively reducing the number of Pixels. For example, downsampling by a factor of two (divide by 2) disposes of one-half the number of pixels, and the process is performed in both the X and Y directions which result in the number of pixels being reduced to one-quarter of the original number of pixels. After the downsampling, the graphic-type information is then compressed using the modified Huffman code. The information is then stored in memory 16 for later transmission. The information is thereafter retrieved by the message controller 22 which combines the information retrieved from the first format region, a first type information; the second format region, a second type information; and the third format region, a third type information to form a composite information.

The processing of a regular paging message is well known to one of ordinary skill in the art. Referring again to FIG. 1, the composite information is coupled to the selective call terminal 28 via the message controller 22. Specifically, the message controller 22 retrieves the information from the message memory 16 which is combined to form composite information, and the selective call terminal 28 encodes the composite information using a protocol suitable for the transmission of information via a radio frequency link. As is well known, these protocols add error detection and correction capabilities to the information link, thus insuring the delivery of error free data to the paging subscriber. The selective call terminal 28 also serves to control a transmitter 30 (or transmitters in a multi-cast system) and to generate a queue for incoming and outgoing paging FAX messages.

When the selective call terminal 28 has completed processing the incoming composite FAX information to form a composite selective call FAX information, the transmitter 30, which comprises a base station and an antenna, broadcasts a signal modulated with composite FAX information representing the selective call address and the composite information from the different format regions. A selective call receiver 40 is then able to detect its address, recovers the composite information, alerts the user, and makes the received composite information available for presentation to the user in a variety of formats including but not limited to ASCII text, characters, graphics and audio. Some specialized applications that can be accommodated by the preferred embodiment of the selective call communication system 10 are electronic mail, storage, retrieval, and forwarding of facsimile messages, and integration of text with graphics into a compound document architecture compatible with industry standard computer productivity software applications.

Figure 3:
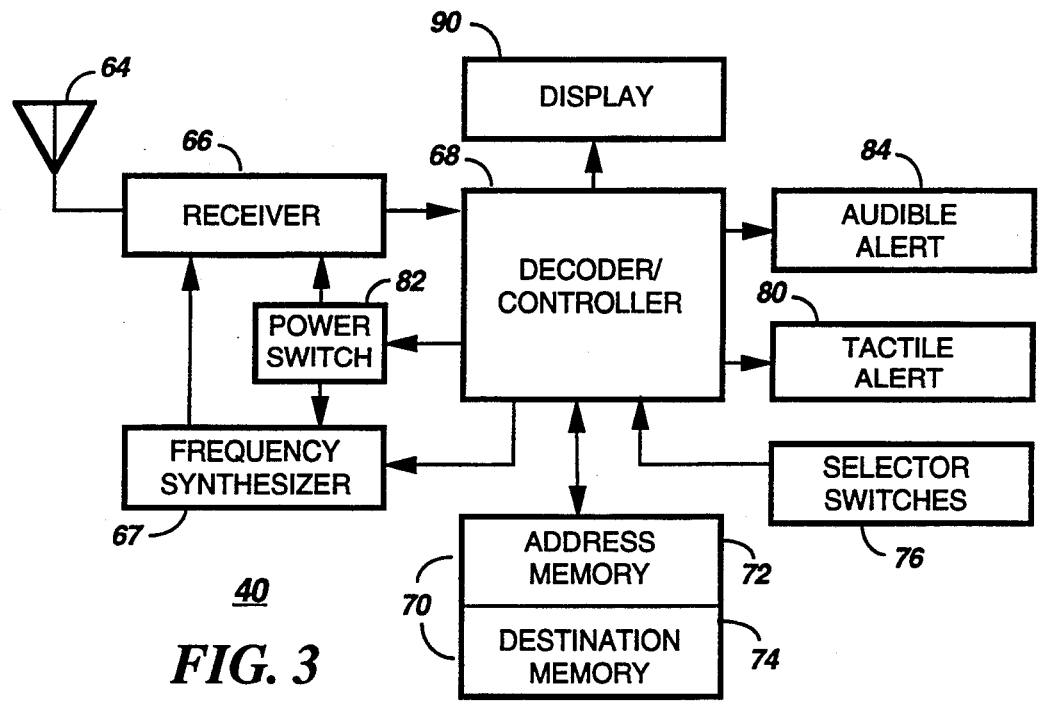
FIG. 3 is an electrical block diagram of a selective call receiver in accordance with the preferred embodiment of the present invention.

Referring to FIG. 3, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information (composite information) stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as the tactile alerting device 80. The tactile alerting device 80 preferably provides a silent vibratory output alerting the subscriber that the destination selected is being approached.

When the selective call receiver 40 is used to provide both destination notification alerting and paging capability including FAX capability, the addresses assigned to the selective call receiver 40 for use in the selective call communication system are stored in an address memory 72 portion of memory 70. The decoder/controller 68 then controls the generation by the frequency synthesizer 67 of the selective call communication system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 4:
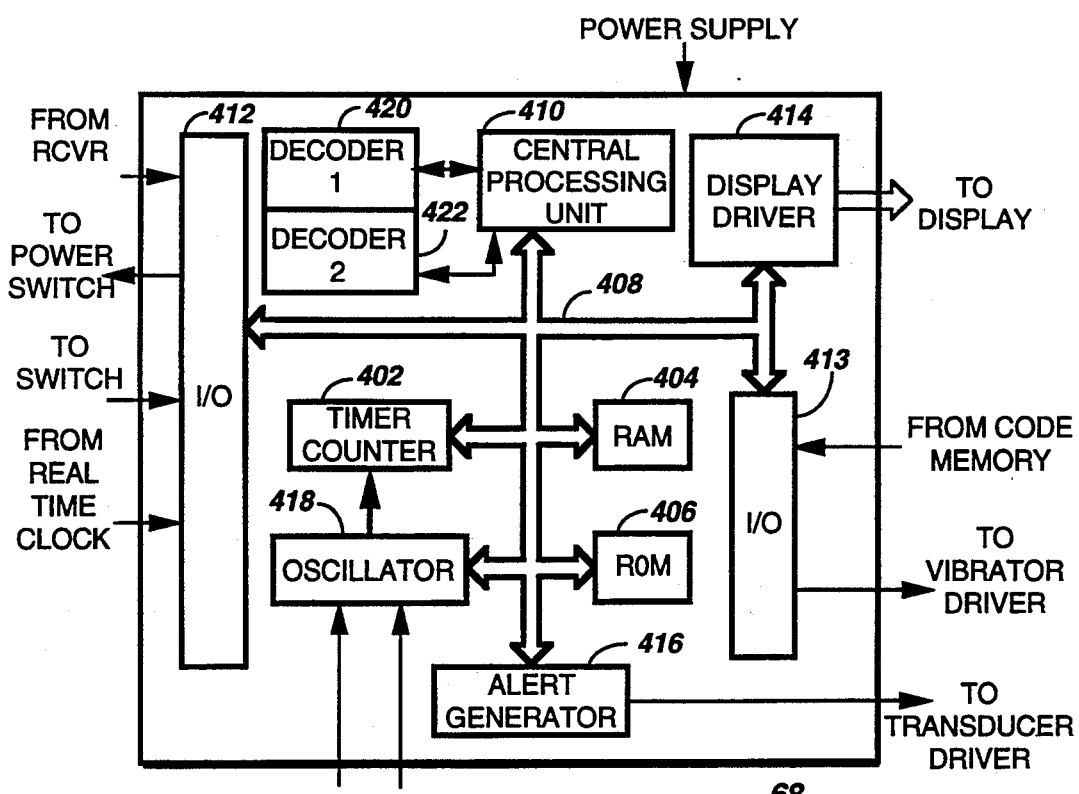
FIG. 4 is an electrical block diagram of a microcomputer based decoder/controller used in the selective call receiver of FIG. 3.

The controller/decoder 68 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 68 is preferably of the family of MC68HC05 series microcomputers, such as manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of composite FAX paging information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410 and when the received address is the same as that stored within the code-plug memory which couples into the microcomputer through, for example an I/O port 413, the selective call FAX message is received and stored in RAM 404. The CPU 410 is coupled to at least two decoders 420, 422. The decoder 420, according to the preferred embodiment of the present invention, decodes the first type information which is encoded as ASCII text, and the decoder 422 decodes the second type information which is encoded as the graphic information. The decoded text and graphic information is stored as a composite information in the ROM 406. Recovery of the stored message, and selection of the predetermined destination address, is provided by the switches which are coupled to the I/O port 412. The microcomputer 68 then recovers the stored message and directs the information over the data bus 408 to the display driver 414 which processes the information and formats the information for presentation by the display 90 (FIG. 3) such as an LCD (liquid crystal display). It can be appreciated by one of ordinary skill in the art that the display 90 on the selective call receiver 40 is substantially smaller than a computer screen. This difference in size, for example, requires the source document 26 to be partitioned into the region of interest 42 for receiving the user's text and graphic information. The predefined information region 42 (FIG. 1) is sized such as to enable the FAX information to be easily displayed on the display 90 of the selective call receiver 40 without excessive processing (or manipulation) by the user. When the selective call receiver 40 receives its address, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

The battery saver operation is controlled by the CPU 410. The battery saving signals are directed over the data bus 408 to the I/O port 412 which couples to the power switch 82 (FIG. 3). Power is periodically supplied to the receiver to enable decoding of the received selective call receiver address signals and the selective call composite FAX information which is directed to the selective call receiver 40. The composite information, preferably comprise the selective call FAX text and graphic information, is stored and ready to be displayed on the display 90.

Figure 5:
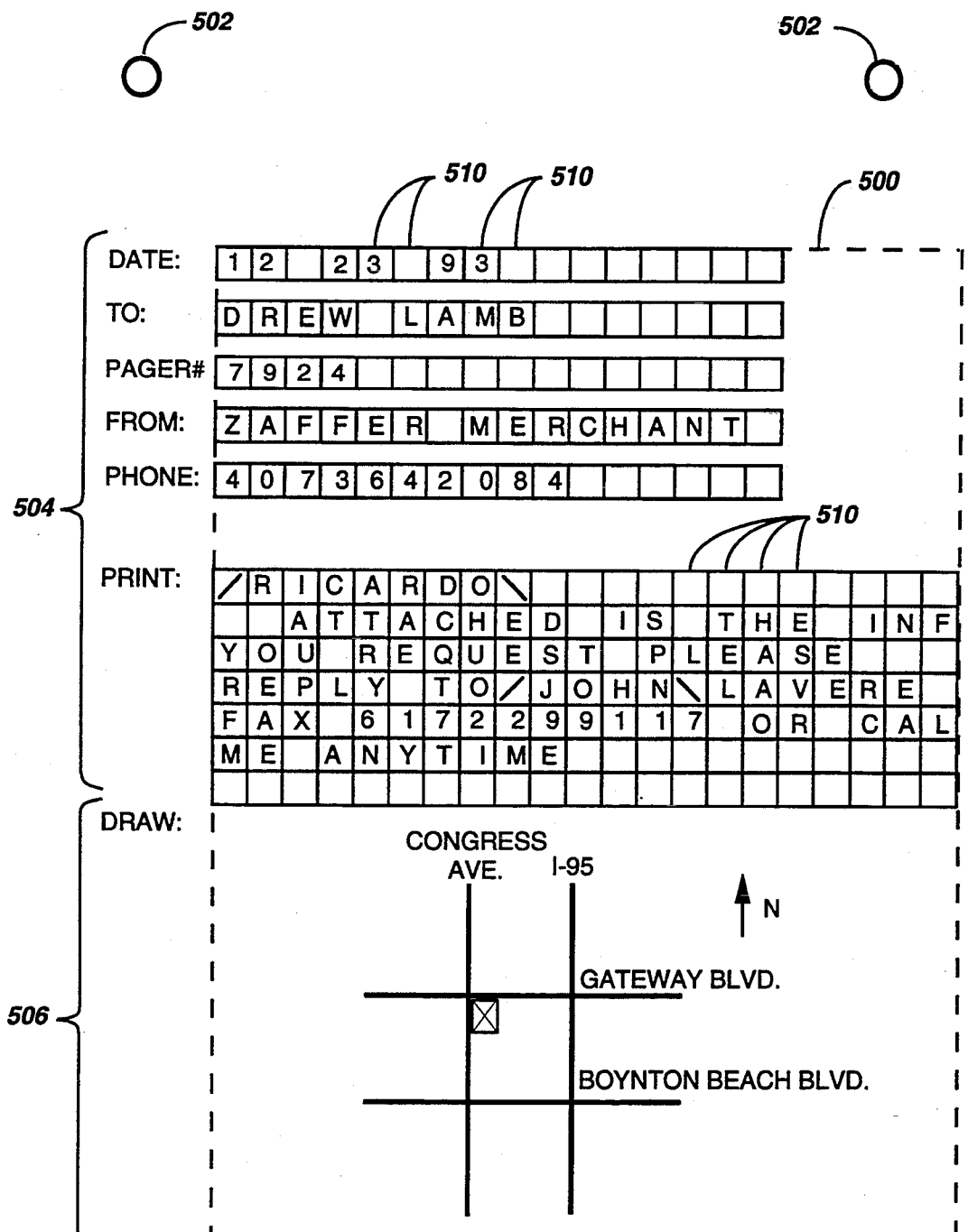
FIG. 5 illustrates a source document according to the preferred embodiment of the present invention.

Referring to FIG. 5, an illustration of the source document is shown according the preferred embodiment of the present invention. The source document 26 includes the region of interest 500 which comprises the first format region 504, and the second format region 506. Preferably, the first format region 504 comprise a first type information which a handwritten letters, characters, and symbols entered into the fixed fields 510 of the first format region and encoded ASCII text. The first type information is, for example, categorized as an address for the selective call receiver (pager) to be paged and other system information, and the handwritten message. The sender of the FAX information simply, within the fixed fields 510, enters the information and message in the first format region 504 which is subsequently retrieved from the source document 26 and sent to the selective call receiver to which it is intended.

In the second format region 506, the sender, within the predefined space can provide a drawing, graph or other pictorial information which will be processed and also sent to the user of the selective call receiver intended for the information. Unlike the first format region, the sender is not constrained to enter the information in fixed fields, but is permitted free format writing and drawing which are processed as bit-map graphic images. Markers 502 are positioned on the source document for providing accurate location of the region of interest 500 and ultimately for enabling the first and second type information to be retrieved form the source document 26. This information is later encoded, processed, as discussed above, and delivered to the selective call receiver.

Figure 6:
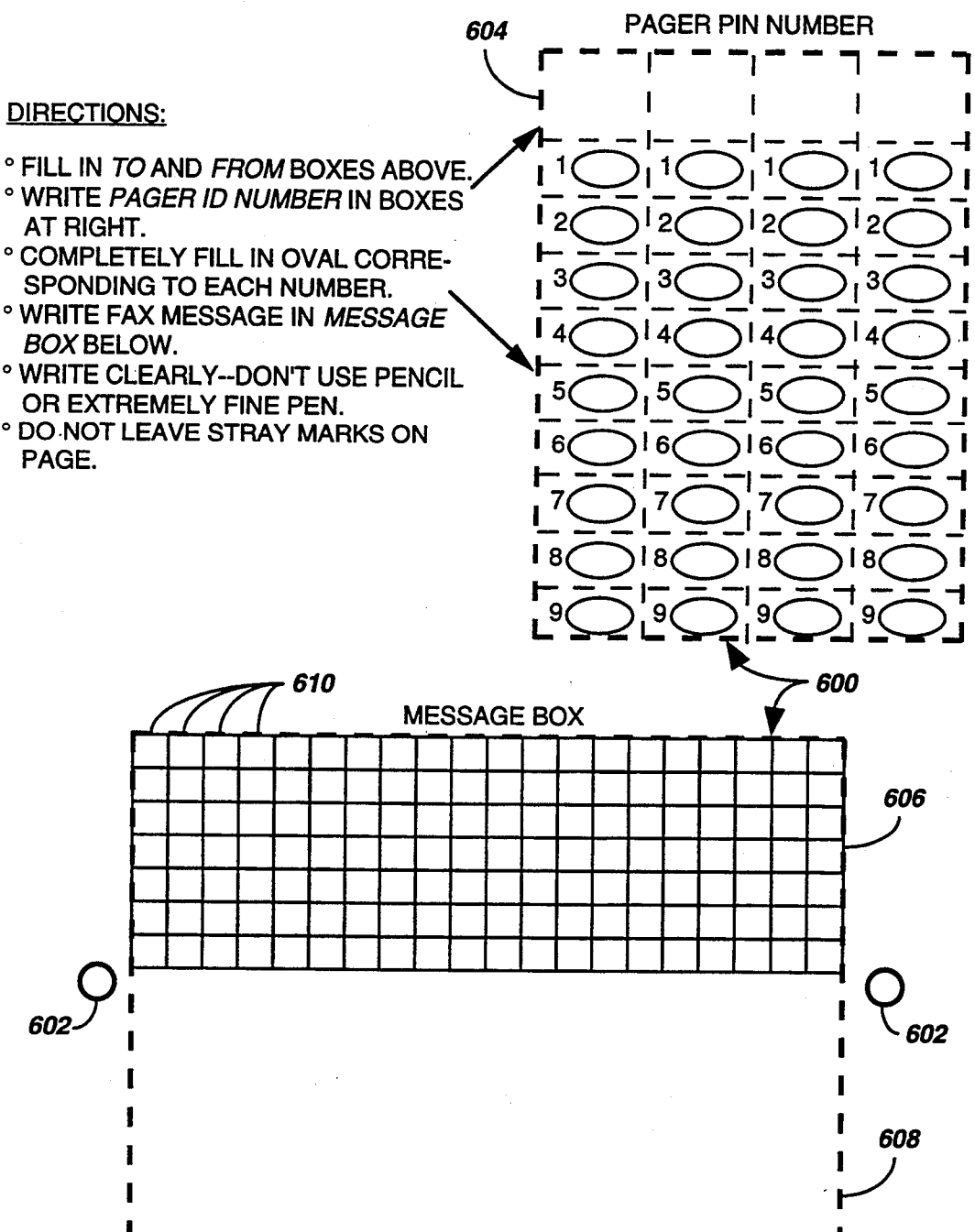
FIG. 6 illustrates an alternate embodiment of the source document according to the present invention.

Referring to FIG. 6, an alternate embodiment of the source document is shown according to the present invention. The source document 26 is substantially similar to the source document 26 of FIG. 6 except for the following differences. The region of interest 600 is illustrated as two disjoint areas which includes a first format region 604, a second format region 606, and a third format region 608. The first format region 604 includes the address the selective call receiver to be paged, and other system information. This information is entered by bubbling the appropriate cell (1 through 0) of each column. In can be understood by one of ordinary skill in the art that the invention is not limited to the actual embodiments shown, but include other variations that becomes readily apparent from the embodiment illustrated. The second format region 606 comprises a first type information which is similarly entered in fixed fields 610 and later encoded as ASCII text, which is preferably handwritten by the sender. The third format region 608 is designated for graphic, drawings or other pictorial information similar to FIG. 5.

In this way, the source document provides a simple and efficient method and apparatus for a sending FAX information, which includes text and graphic information, to a person on the move who has a selective call receiver, by entering the appropriate information in designated regions. The information is processed and transmitted to the selective call receiver which receives and displays the information to its user without destroying the battery life of the selective call user.

Figure 7:
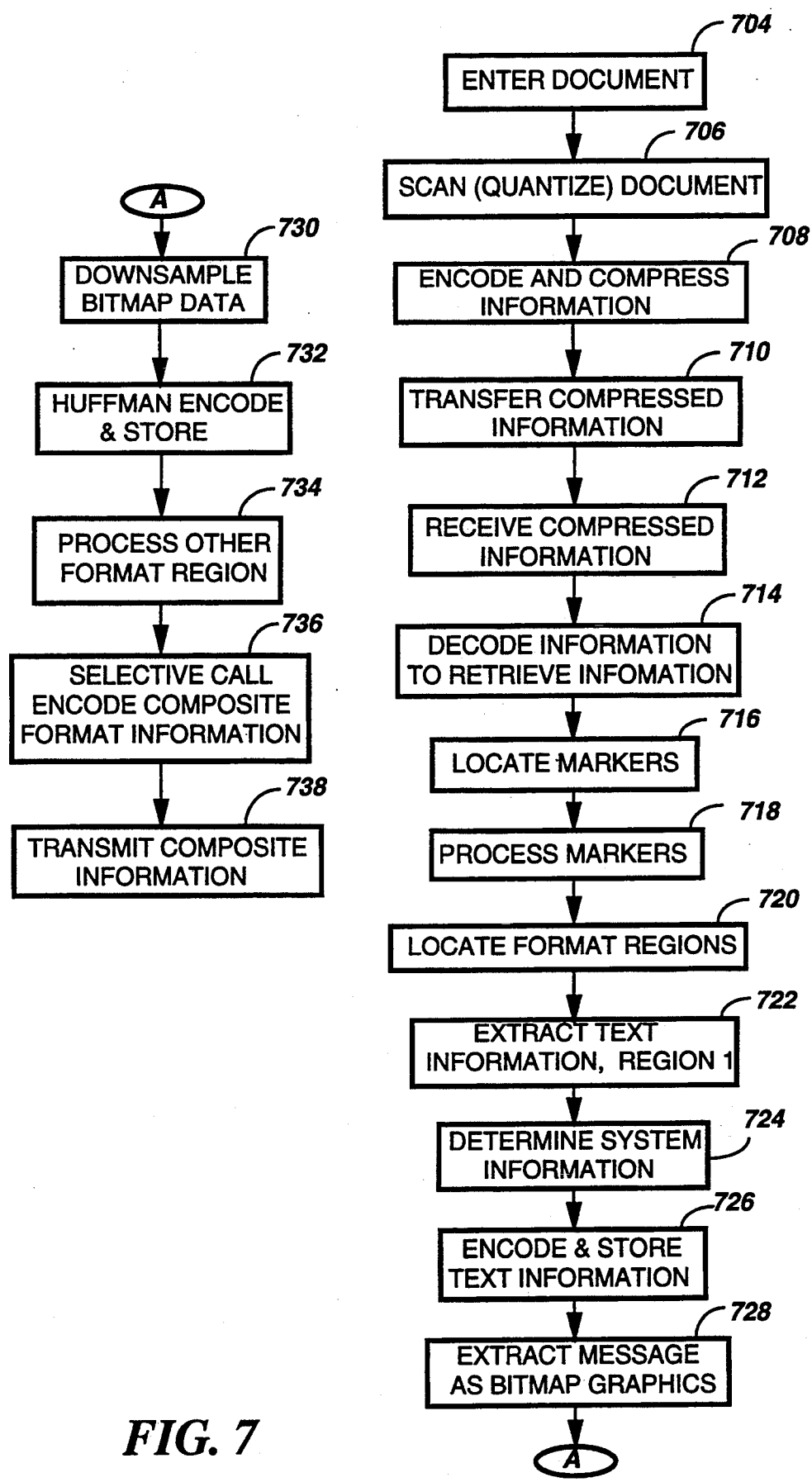
FIG. 7 is a flow diagram illustrating facsimile communication in accordance with the preferred embodiment of the present invention.

Referring to FIG. 7, a flow diagram illustrating facsimile communication is shown in accordance with the preferred embodiment of the present invention. When the source document 26 has been entered, step 704, the FAX machine 14 scans and quantizes the information on the source document 26, step 706. The quantized information is then compressed and encoded, preferably according to the Group III facsimile standard, step 708. The encoded and compressed information is transferred from the FAX machine 14 to the message controller 22 via the PSTN 24, step 710. The message controller 22 receives the compressed information and stores it in memory to be accessed by the processor 20 which processes the compressed data before transmission to its designated selective call receiver 40, step 712. The received information is then decoded form the Group 3 encoded format to retrieve the information, step 714. However, to locate the actual information, markers are placed a predefined location on the source documents for accurately locating the region of interest even after the information was distorted due transmission, step 716. Once the markers are located, the format regions, preferably the first and second format regions are processed, subsequent to any necessary corrections, by determining the X-Y coordinate offset from the located markers, step 718. Each format region has a predetermined X-Y coordinates offset which locate the particular format region in the region of interest, step 720. Preferably, the first format region is located first, and the text information is extracted, step 722. The system information along the address (cap code) of the selective call receiver are determined and used to transfer the information the selective call receiver to which it is intended, step 724. The text information portion, after being extracted from the predefined fields, is encoded as ASCII text and stored for later transmission, step 726.

After the first format region has been processed, the second format region is identified from its X-Y coordinates, and the information is extracted as bit-map graphic type information, step 728. The extracted information is downsampled, step 730. After the downsampling processing, the information is further encoded using the Huffman coding scheme, well known to one of ordinary skill in the art. The Huffman encoding step compresses the downloaded information further, and after the Huffman encoding, the information is stored, step 732. The other format regions, if any, are processed and stored, step 734. The information retrieved from the first and second format regions are combined to form composite information and selective call encoded, a technique well known to one of ordinary skilled in the art, step 736. The selective call encoded composite information is then transmitted to the intended the selective call receiver, step 738, the address of which is encoded in the selective call FAX information being transmitted therewith.

In this way, the invention requires the user to enter the information to be FAXed. The information comprise handwritten and graphic-type information in the region of interest which enables the information to be displayed easily on the display of the selective call receiver. After the message is processed by a conventional FAX machine, a second compression is performed on the information. The second compression step reduces the Group III FAX encoded information to an information size that can be transmitted according to current paging standards without overloading the communication system. When encoded, the composite information results in a message which elegantly fits within the constraints of the selective call communication without seriously degrading battery life or battery saving features.

Figure 8:
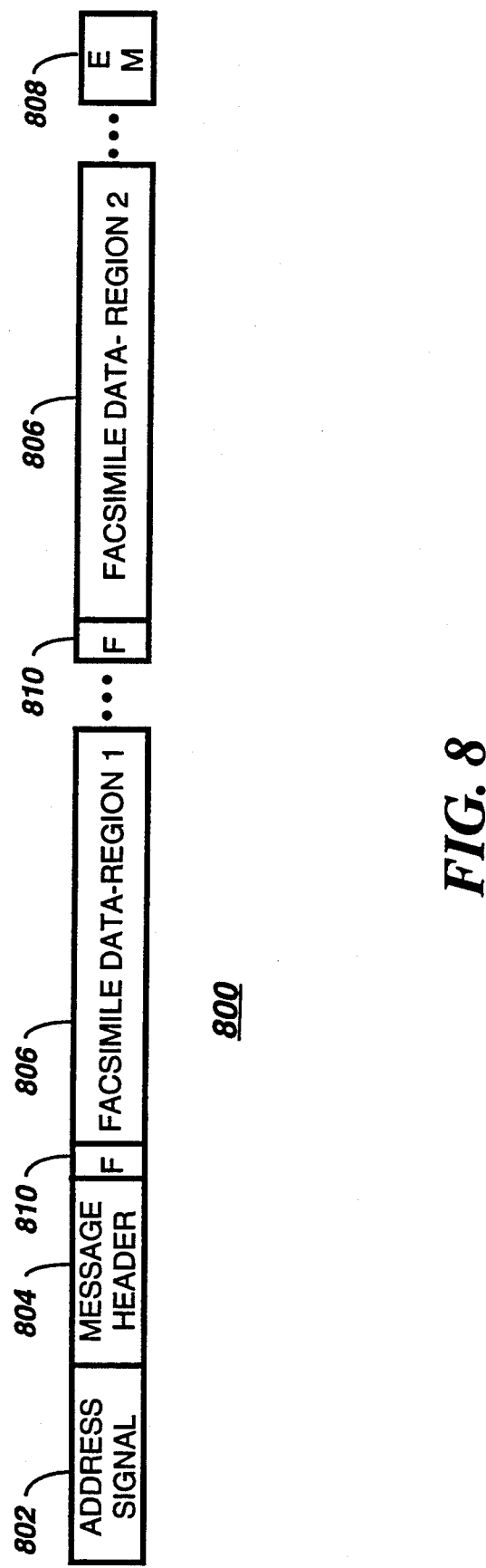
FIG. 8 is a protocol diagram of a selective call information signaling format in accordance with the preferred embodiment of the present invention.

Referring to FIG. 8, a protocol diagram of a selective call communication format is shown in accordance with the preferred embodiment of the present invention. The signaling protocol is used for addressing and transmitting facsimile information to the selective call receiver 40 using any facsimile standard. A FAX paging information packet 800 comprises a selective call address 802, a facsimile message header 804, format or message type identifier 810, data blocks 806 encoded in Group III facsimile data, and an end-of-message flag 808. The end-of-message flag 808 can be omitted without compromising the integrity of this signaling format. The address signal 802 comprises a conventional selective call address of a type that is well known to one of ordinary skill in the art. The message header 804 contains information on the data block length, FAX protocol type, a data flag to determine if a FAX or a regular paging message is being received and possibly an encryption type for use in a secure FAX messaging system. Following the message header 804 is the format identifier 810 which identifies whether the following information is ASCII text or bit-map graphic image. Following the format identifier 810 is the data block 806 containing standard facsimile data of the format or type indicated by the format identifier. This embodiment can be used in conjunction with a conventional FAX machine to receive FAX messages via a wireless data channel. Furthermore, when used in conjunction with a personal computer or the like (e.g., a laptop computer), the selective call receiver as illustrated in FIG. 3 can couple the received FAX message data to the computer for storage in a file, thus allowing the user to have an archive of the received FAX messages. Since the received FAX message data is unaltered from its native transmission format, conventional facsimile data manipulation hardware and software can be used to obtain a hardcopy of the received FAX.

Figure 9:
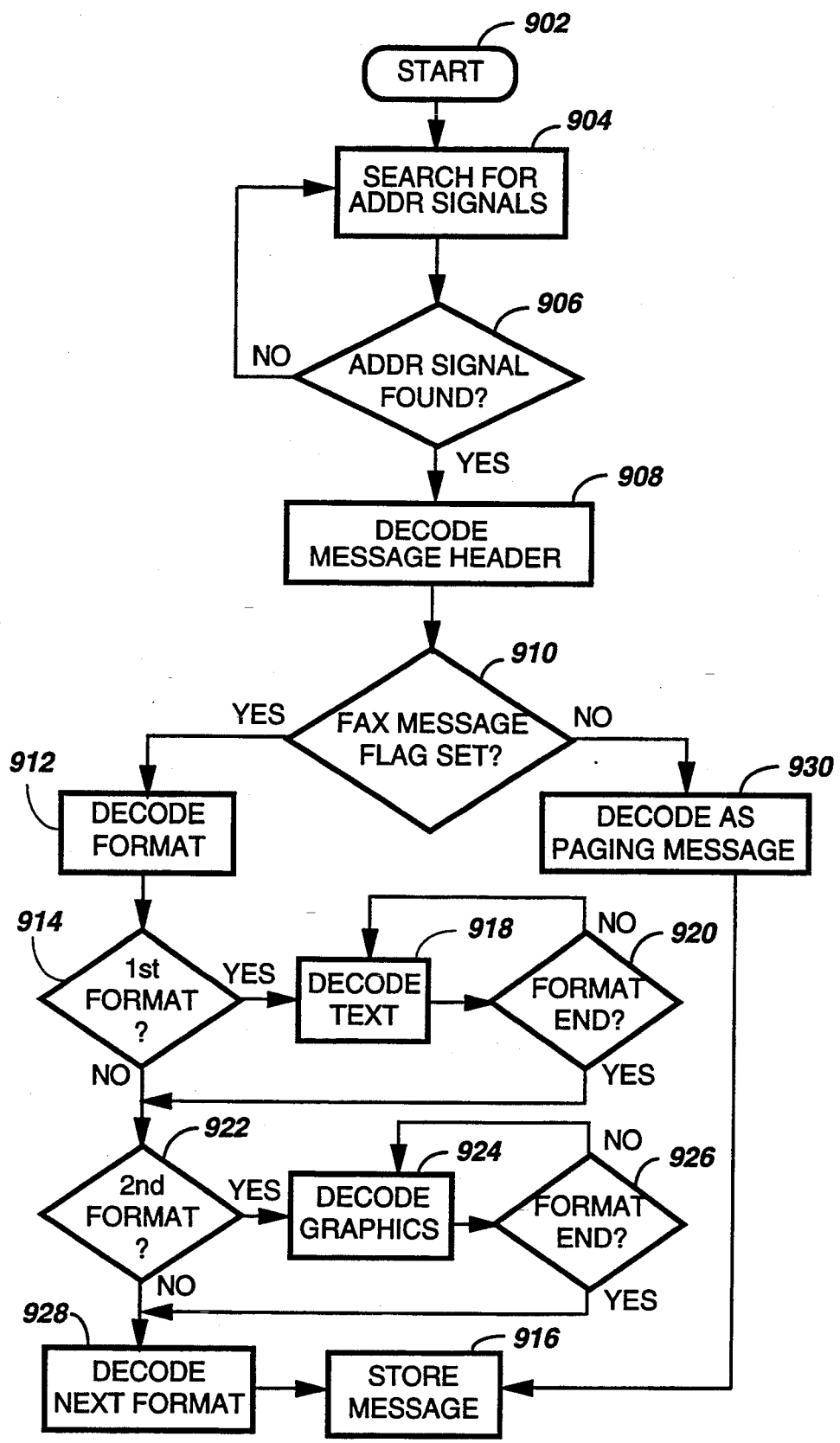
FIG. 9 is a flow diagram illustrating the operation of the selective call receiver in FIG. 3.

Referring to FIG. 9, the flow diagram illustrates the receiving operation of the selective call receiver of FIG. 3. The process of receiving a selective call message begins at step 902. In step 904, the address decoder searches a received signal for an address signal. Step 906 tests any recovered address signals to determine if they correlate with at least one predetermined address associated with the selective call receiver 40. If the received address does not correlate (match), control is returned to step 904 and a new search is performed. When a received address correlates with at least one predetermined address associated with the selective call receiver, step 908 decodes the message header then passes control to step 910. Step 910 tests for the presence of a FAX data flag. If step 910 is false, the following data block will contain symbols that will be decoded as a conventional paging message, step 930. When decoding is complete, step 916 stores the data and step 926 tests for an end of message condition which may be indicated by an end-of-message marker or the lack of another data flag. If step 926 is false (not yet at end of message) and step 910 is true, the following data block will contain a FAX message.

The format of the message is decoded to determine whether to decode that portion of the message as ASCII text or bit-map graphic image, step 912. Step 914 then determines if the first type information is being received, and if so, the message is decoded as ASCII text, step 918. Thereafter, the processor determines if the message in that format is completed received step 920, and if not, the processor continues to decode the text message, step 918. However, when the end-of-text message is received, step 920, the process continues to step 922. Also, if the first format is not received, step 912, the process continues to determine if the second type message is being received, step 922. If so, the message is decoded as graphic information, step 924. Step 926 determines if the end-of second type message is received, and if not, the processor continues the decode graphic information, step 922. However, if the second type information is not received, or the end-of-second type message has been received, the selective call receiver continues to decode a next type message, if any is present, step 928. At step 916, the decoded information is stored for subsequent presentation, step 916.

The decoding of a text, symbol, and graphic information are accomplished by applying the inverse of the procedures discussed in reference to FIGS. 1 and 2. To display the received FAX message, each coded section is decoded and their respective positions mapped into the presentation device's display memory. After mapping the storing rectilinear coordinates into the presentation device's display space, the message is re-assembled according to the format types or information type into a recovered format that substantially resembles the format of the original source document and the recovered information is presented preferably different type information at a time.

In this way, the FAX message is encoded and transmitted to the designated selective call receiver. The selective call receiver, upon detecting its address, receives the FAX message which is stored and presented to the user on the display of the selective call receiver. In summary, the preferred embodiment of the present invention comprises a method of facsimile communication, comprising the steps of:

(a) retrieving information from a source document. The information retrieved from the source document is formatted in at least two format regions. The at least two format regions comprise a first format region designated for a first type information, and a second format region designated for a second type information; The method further comprises the steps of: (b) encoding and compressing the information; (c) transferring the information to a selective call terminal; (d) receiving the information at the selective call terminal; (e) processing the information. The step of processing in the selective call terminal further comprises the steps of: (e1) searching for an at least one marker in the information; (e2) determining a location of a region of interest within the information relative to the at least one marker; (f) identifying the first type information received within the first format region and the second type information received within the second format region; (g) encoding and compressing the first type information according to a first encoding and compression technique; and (h) encoding and compressing the second type information according to a second encoding and compression technique; and (i) transmitting the information being processed to an at least one selective call receiver, the step of transmitting further comprising a step of selective call encoding the first type and second type information for transmission to the at least one selective call receiver.

The invention, therefore, requires the user to enter a message to be FAXed. The message is handwritten and drawn in a the region of interest indicative of the format in which the message will be encoded. After the message is processed by a conventional FAX machine, a second compression step reduces the Group III FAX encoded data to a message size that can be transmitted according to current paging standards without overloading the communication system. When encoded, the composite (message of text and graphic) message results in a message which elegantly fits within the constraints of the selective call communication without seriously degrading battery life or battery saving features.

What is claimed is:

1. In a selective call communication system, a method of facsimile communication, comprising the steps of:
   (a) retrieving information from a source document, the information from the source document being formatted in at least two format regions, wherein the at least two format regions comprise a first format region being designated for a first type information, and a second format region being designated for a second type information;
   (b) encoding and compressing the information;
   (c) transferring the information to a selective call terminal;
   (d) receiving the information at the selective call terminal;
   (e) processing the information, the step of processing in the selective call terminal further comprises the steps of:
   (f) identifying the first type information received from the first format region and the second type information received from the second format region;
   (g) encoding and compressing the first type information according to a first encoding and compression technique; and
   (h) encoding and compressing the second type information according to a second encoding and compression technique; and
   (i) transmitting the information being processed to an at least one selective call receiver.

2. The method according to claim 1 wherein the step of transmitting further comprising a step of selective call encoding the first type and second type information for transmission to the at least one selective call receiver.

3. The method according to claim 1 wherein the step of processing further comprising the steps of:
   searching for at least one marker within the information; and
   determining a location of a region of interest within the information relative to the at least one marker.

4. The method according to claim 3 wherein the step of determining further determines the first and second format regions contained within the region of interest being located.

5. The method according to claim 1 wherein the step (h) of encoding and compressing further comprises a step of downsampling the second type information.

6. A selective call communication system, comprising:
   a scanner for retrieving information from a source document, the source document includes a region of interest being formatted in at least two format regions, wherein the at least two format regions comprise a first format region being designated for a first type information, and a second format region being designated for a second type information; the scanner further comprising:
   an encoder for encoding and compressing the information; and
   a modem, coupled to the encoder, for transferring the information to a selective call terminal; the selective call terminal, comprising:
   a receiver for receiving the information; and
   a processor, coupled to the receiver, for processing the information, the processor further comprising:
   a first encoder for encoding and compressing the first type information according to a first encoding and compression technique; and
   a second encoder for encoding and compressing the second type information according to a second encoding and compression technique; and
   a transmitter, coupled to the processor, for transmitting the information being processed to an at least one selective call receiver.

7. The selective call communication system according to claim 6 wherein the first encoder encodes and compresses the first type information according to an ASCII standard for text information.

8. The selective call communication system according to claim 6 wherein the second encoder encodes and compresses the second type information as graphics information.

9. The selective call communication system according to claim 8 wherein the second encoder further comprises means for run length encoding the graphics information.

10. The selective call communication system according to claim 6 wherein the second encoder further comprises means for downsampling the second type information.

11. The selective call communication system according to claim 6 wherein the transmitter further comprising a selective call encoder for encoding the first type and second type information for transmission to the at least one selective call receiver.

12. The selective call communication system according to claim 6 wherein the processor further comprising:
    means for detecting at least one marker in the information; and
    means, coupled to the means for detecting, for determining a position of the region of interest relative to the at least one marker.

13. The selective call communication system according to claim 12 wherein the means for determining determines the first and second format regions contained within the region of interest.

14. In a selective call receiver, a method for receiving paging and facsimile information, comprising the steps of:
    (a) receiving information;
    (b) determining when the facsimile information is being received, the facsimile information is formatted according to at least two format types, wherein the at least two format types comprise a first format type being designated for text information, and a second format type being designated for graphics information;
    (c) decoding a text information portion of the facsimile information;
    (d) decoding a graphics information portion of the facsimile information;
    (e) storing the text and graphics information decoded in steps (c) and (d) as a composite information;
    (f) displaying the composite information.

15. The method according to claim 14 wherein step (b) of determining further comprising a step of decoding the paging information being received.

16. The method according to claim 14 wherein the step (d) of decoding further includes a step of run length decoding the graphics information.

17. A selective call receiver for receiving paging and facsimile information, comprising:
- a receiver for receiving information;
- a processor, coupled to the receiver, for determining when the facsimile information is being received, the processor determines an at least two format types of the facsimile information, the at least two format types comprise a first format type being designated for text information, and a second format type being designated for graphics information;
- a first decoder, coupled to the processor, for decoding a text information portion of the facsimile information;
- a second decoder for decoding a graphics information portion of the facsimile information;
- a memory, coupled to the first and second decoders, for storing the text and graphics information as a composite information;
- a display, coupled to the memory, for displaying the composite information.

18. The selective call receiver according to claim 17 further comprising a third decoder for decoding paging information.

19. The selective call receiver according to claim 17 wherein the second decoder further comprises means for run length decoding the graphics information.

20. In a selective call communication system, a method of facsimile communication, comprising the steps of:
- (a) retrieving information from a source document, the information retrieved from the source document being formatted in at least two format regions, wherein the at least two format regions comprise a first format region being designated for a first type information, and a second format region being designated for a second type information;
- (b) encoding and compressing the information;
- (c) transferring the information to a selective call terminal;
- (d) receiving the information at the selective call terminal;
- (e) processing the information, the step of processing in the selective call terminal further comprises the steps of:
  - (e1) searching for an at least one marker in the information;
  - (e2) determining a location of a region of interest within the information relative to the at least one marker;
- (f) identifying the first type information received within the first format region and the second type information received within the second format region;
- (g) encoding and compressing the first type information according to a first encoding and compression technique; and
- (h) encoding and compressing the second type information according to a second encoding and compression technique; and
- (i) transmitting the information being processed to an at least one selective call receiver, the step of transmitting further comprising a step of selective call encoding the first type and second type information for transmission to the at least one selective call receiver.

* * * * *